United States Patent
Grewal et al.

(10) Patent No.: US 11,914,611 B2
(45) Date of Patent: *Feb. 27, 2024

(54) SYSTEMS AND METHODS OF DATA RECORD MANAGEMENT

(71) Applicant: ROYAL BANK OF CANADA, Toronto (CA)

(72) Inventors: Daniel Grewal, London (GB); Tariq Piperdy, London (GB)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,991

(22) Filed: Apr. 25, 2022

(65) Prior Publication Data
US 2022/0253456 A1 Aug. 11, 2022

Related U.S. Application Data

(63) Continuation of application No. 17/085,500, filed on Oct. 30, 2020, now Pat. No. 11,314,768.
(Continued)

(51) Int. Cl.
*G06F 7/00* (2006.01)
*G06F 16/25* (2019.01)
(Continued)

(52) U.S. Cl.
CPC ........ *G06F 16/258* (2019.01); *G06F 16/3344* (2019.01); *G06F 40/20* (2020.01); *G06N 20/00* (2019.01)

(58) Field of Classification Search
CPC ............... G06F 16/258; G06F 16/3344; G06F 16/3347; G06F 16/24542; G06F 16/248;
(Continued)

(56) References Cited

U.S. PATENT DOCUMENTS 11,314,768 B2 * 4/2022 Grewal ................... G06F 40/20
2015/0317303 A1 * 11/2015 Zhang ..................... G06F 40/40
707/776

(Continued)

*Primary Examiner* — Mohammad A Sana
(74) *Attorney, Agent, or Firm* — Norton Rose Fulbright Canada LLP

(57) ABSTRACT

A system and method of data record management is provided. The system comprises a processor and a memory coupled to the processor that stores processor-executable instructions that when executed configure the processor to perform the method. The method comprises receiving a plurality of unstructured natural language data records, generating a structured dataset based on the plurality of unstructured natural language data records, transforming the structured dataset to normalize the respective frequency values based on inverse proportionality of the respective frequency values, determining a redundancy prediction value associated with that unstructured natural language data record based on the transformed structured dataset, and displaying on a graphical user interface a message identifying one or more unstructured natural language data records being associated with a redundancy prediction value greater than a threshold value. The structured dataset includes a frequency value associated with respective terms of each of the plurality of unstructured natural language data records.

20 Claims, 12 Drawing Sheets

Related U.S. Application Data

(60) Provisional application No. 62/928,801, filed on Oct. 31, 2019.

(51) Int. Cl.
*G06F 16/33* (2019.01)
*G06F 40/20* (2020.01)
*G06N 20/00* (2019.01)

(58) Field of Classification Search
CPC ........... G06F 16/24578; G06F 16/2468; G06F 16/2237; G06F 40/20; G06F 40/30; G06N 20/00

See application file for complete search history.

(56) References Cited

U.S. PATENT DOCUMENTS

| | | | |
|---|---|---|---|
| 2017/0103441 A1* | 4/2017 | Kolb | G06F 16/951 |
| 2018/0203922 A1* | 7/2018 | Erpenbach | G06F 16/3334 |
| 2019/0065550 A1* | 2/2019 | Stankiewicz | G06F 16/2237 |

* cited by examiner

SYSTEMS AND METHODS OF DATA RECORD MANAGEMENT

CROSS REFERENCE TO RELATED APPLICATIONS

This application is a continuation of U.S. patent application Ser. No. 17/085,500, dated Oct. 30, 2020 entitled SYSTEMS AND METHODS OF DATA RECORD MANAGEMENT, which claims the benefit of and priority to U.S. Patent Application No. 62/928,801, dated Oct. 31, 2019 entitled SYSTEMS AND METHODS OF DATA RECORD MANAGEMENT, each of which are incorporated herein in its entirety by reference.

FIELD

Embodiments of the present disclosure generally relate to the field of data record management and, in particular, to systems and methods of data record management of natural language data records.

BACKGROUND

Database management systems may receive data from a numerous computing devices in the form of unstructured natural language data records. Such systems may store the unstructured natural language data records, may conduct analysis on the stored data records, and may conduct operations for generating reports on the stored data records. In some examples, the unstructured natural language data records may store employee performance review records or other types of data.

SUMMARY

In one aspect, there is provided a system for data record management. The system comprises a communication interface, a processor coupled to the communication interface, and a memory coupled to the processor. The memory may store processor-executable instructions that, when executed, configure the processor to receive a plurality of unstructured natural language data records, generate a structured dataset based on the plurality of unstructured natural language data records, transform the structured dataset to normalize the respective frequency values based on inverse proportionality of the respective frequency values, determine for each of the unstructured natural language data records a redundancy prediction value associated with that unstructured natural language data record based on the transformed structured dataset, and generate a communication signal for displaying on a graphical user interface a message identifying one or more unstructured natural language data records being associated with a redundancy prediction value greater than a threshold value. The structured dataset includes a frequency value associated with respective terms of each of the plurality of unstructured natural language data records.

In another aspect, there is provided a method of data record management. The method comprises receiving a plurality of unstructured natural language data records, generating a structured dataset based on the plurality of unstructured natural language data records, transforming the structured dataset to normalize the respective frequency values based on inverse proportionality of the respective frequency values, determining a redundancy prediction value associated with that unstructured natural language data record based on the transformed structured dataset, and displaying on a graphical user interface a message identifying one or more unstructured natural language data records being associated with a redundancy prediction value greater than a threshold value. The structured dataset includes a frequency value associated with respective terms of each of the plurality of unstructured natural language data records.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Examples of embodiments described herein include unstructured data records associated with employee performance reviews. It may be appreciated that any other topical subject matter of textual content may be stored in unstructured data records described herein.

Figure 1:
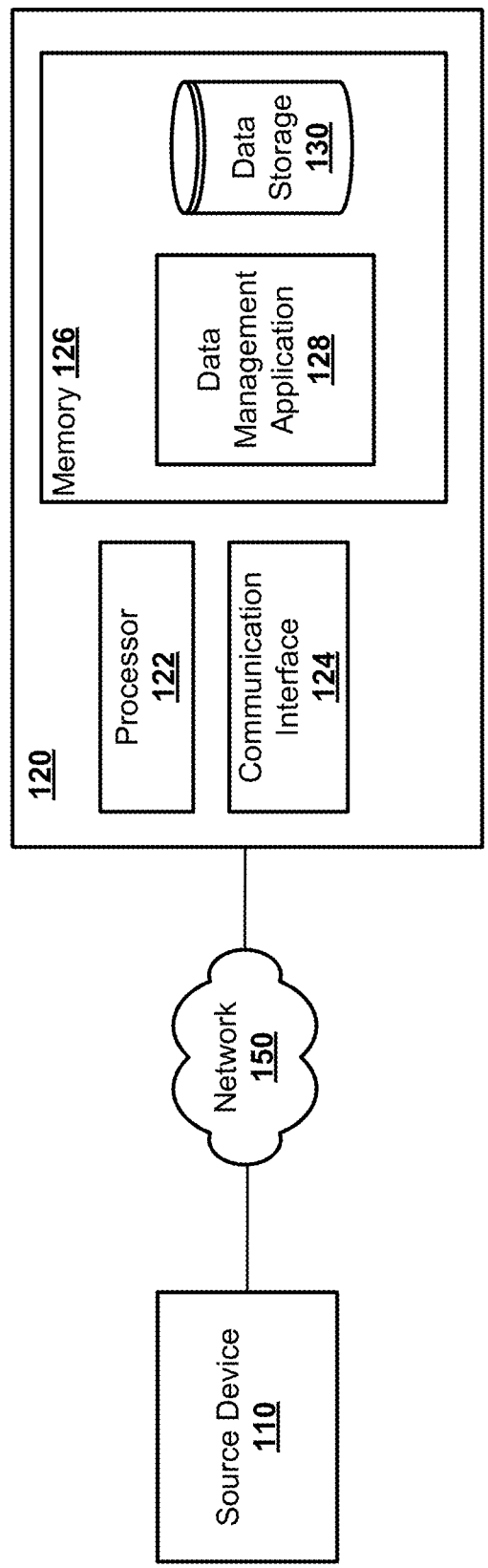
FIG. 1 illustrates an example of a system, in accordance with some embodiments.

Reference is made to FIG. 1, which illustrates a source device 110 and a data record management system 120, in accordance with some embodiments. The source device 110 may transmit and/or receive data messages to/from the data record management system 120 via the network 150. The network 150 may include a wired or wireless wide area network (WAN), local area network (LAN), a combination thereof, or the like.

The source device 110 may be a computing device including a processor, memory, and a communication interface. In some embodiments, the source device 110 may be a computing device associated with user, and may be a laptop or desktop computer, and the user may communicate messages or data to the data record management system 120.

The data record management system 120 may be configured to receive data, such as messages, data records, or the like from the source device 110. FIG. 1 illustrates a sole source device 110, however, in some embodiments, the data record management system 120 may receive data from any number of source devices, via the network 150.

The data record management system 120 includes a processor 122, a communication interface 124, and a memory 126. The processor 122 may be configured to implement processor readable instructions that, when executed, configure the processor 122 to conduct operations described herein. For example, the data record management system 120 may be configured to conduct operations for managing data records received from one or more of the source devices 110.

The data record management system 120 includes a communication interface 124 to communicate with other computing devices, to access or connect to network resources, or to perform other computing applications by connecting to a network (or multiple networks) capable of carry data. In some embodiments, the network 150 may include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combination of these. In some examples, the communication interface 124 may include one or more busses, interconnects, wires, circuits, and/or any other connection and/or control circuit, or combination thereof. The communication interface 124 may provide an interface for communicating data between components of a single device or circuit.

The memory 126 may store a data management application 128 including processor readable instructions for conducting operations described herein. In some examples, the data management application 128 may include operations for determining a redundancy prediction value associated with an unstructured natural language data record and generating a communication signal for displaying on a graphical user interface a message identifying one or more unstructured natural language data records being associated with a redundancy prediction value greater than a threshold value.

The memory 126 may be configured to provide a data storage 130. In some embodiments, the data storage 130 may be a secure data store configured to store unstructured data records, structured data records, or other types of data based on data received from the source device 110.

As an illustrating example, the data record management system 120 may be a computing system for receiving and storing employee performance reviews of an organization. For instance, the employee performance reviews may be reviews of Material Risk Takers of a banking institution, and personnel managers may conduct and write employee performance reviews, via the source device 110, and may transmit the employee performance reviews to the data record management system 120. In some examples, employee performance reviews may include input associated with one or more topics or categories, such as "Conduct", "Financial", or "General".

In some embodiments, the employee performance reviews may be an unstructured natural language data record. That is, the unstructured natural language data record may include a series of questions and a corresponding series of text boxes for natural language text input. Although employee performance review data is described as an example herein, other topics or types of natural language text input stored in one or more unstructured natural language data records may be contemplated.

In some examples, as the source device 110 receives input from personnel managers in unstructured natural language input, it may be desirable to identify a probability that a particular unstructured data record may include non-meaningful content. As illustrating examples, non-meaningful content may include: (i) personnel managers copying and pasting comments between topical goals of a particular employee performance review or copying and pasting comments between two or more employee performance reviews; or (ii) personnel managers providing input that focusing un-proportionally on a topic or category associated with an employee performance review to the exclusion of other topics or categories (e.g., poorly detailed reviews that may as a whole focus on financial aspects of an employee's performance as opposed to both financial and conduct related aspects of the employee's performance).

Figure 2:
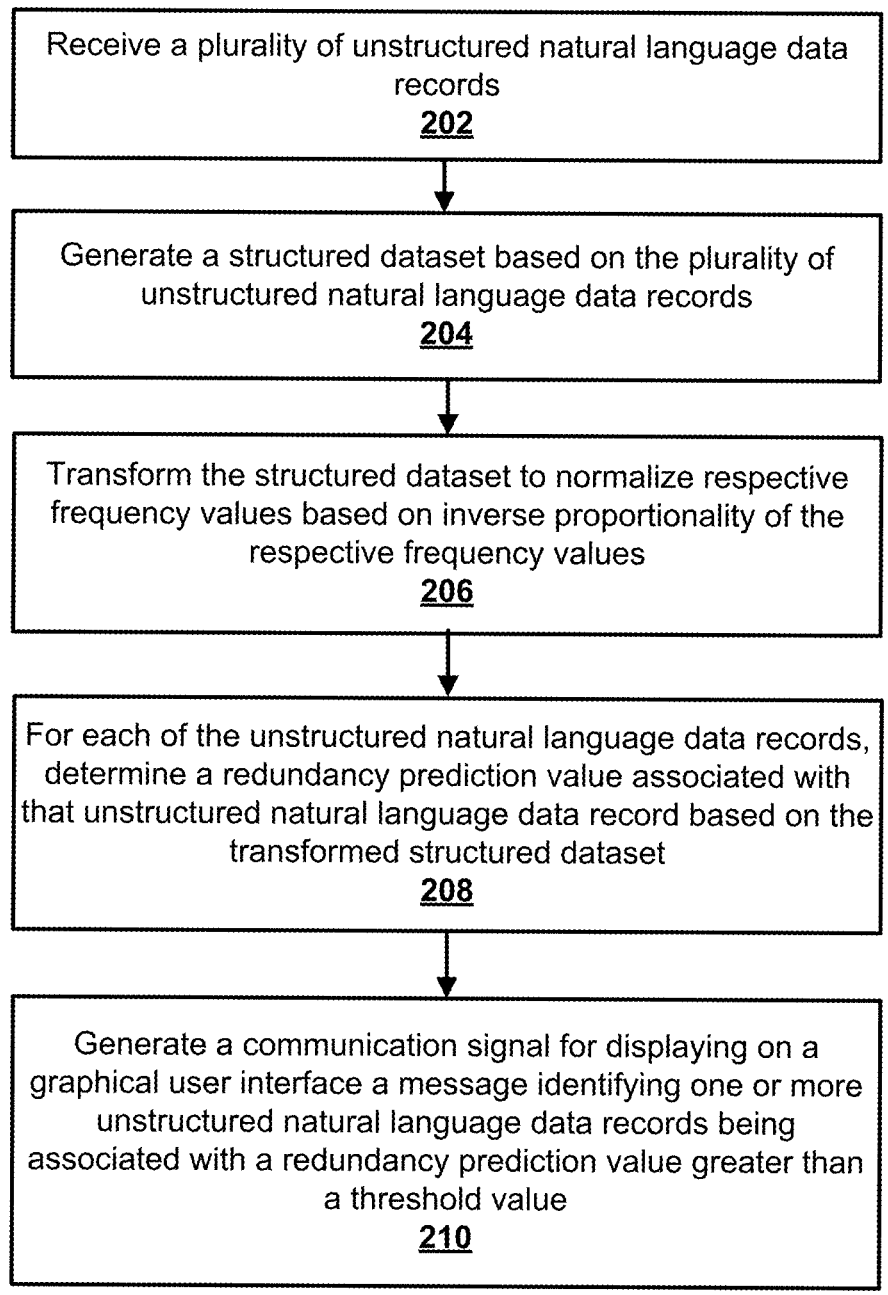
FIG. 2 illustrates, in a flowchart, an example of a method of data record management, in accordance with some embodiments.

Reference is made to FIG. 2, which illustrates, in a flowchart, an example of a method 200 of data record management, in accordance with some embodiments. The method 200 may be conducted by the processor 122 of the data record management system 120 (FIG. 1). Processor readable instructions may be stored in memory 126 and may be associated with the data management application 128 or other processor readable applications not illustrated in FIG. 1. It may be appreciated that embodiments described herein refer to employee performance review data; however, other types of data or data records may be contemplated.

To illustrate features of the present application, the data record management system 120 may receive and store employee performance review data. In some examples, a source device 110 may be a laptop computer associated with a personnel manager user and the personnel manager user may transmit employee performance review data to the data record management system 120. The personnel manager may be responsible for several employees and may be required to provide textual input when completing employee performance reviews.

At operation 202, the processor receives a plurality of unstructured natural language data records. In some embodiments, the processor may receive the plurality of unstructured natural language data records from a sole source device, where each of the unstructured natural language data records may be associated with a unique employee or a unique employee review criteria. In some embodiments, the processor may receive the plurality of unstructured natural language data records from two or more source devices.

In some embodiments, the processor may conduct operations to identify unstructured natural language data records that may lack textual input (e.g., when textual input is expected) and may discard the identified unstructured natural language data records from such plurality of unstructured natural language data records. In some embodiments, the processor may conduct operations to identify unstructured natural language data records that include less than 5 terms/n-grams. For example, the processor may conduct operations to identify unstructured natural language data records having textual input, such as: "As above", "M&A result exceptional", or "I prioritize higher margin business". The processor may conduct operations to identify such textual input as potentially being non-meaningful content.

As an illustrating example, an unstructured natural language data record may include textual input received from a source device 110. The unstructured natural language data record may be a data record for an employee goal "Capital Markets Risk Conduct Goals", and the textual input associated with the employee goal may be:

"Christian leads by example with respect to the risk and business control procedures and requirements and holds his team to his high standards. Christian is thoughtful and diligent about risk and risk mitigation and proactive in designing, implementing and monitoring the various business control tools."

The unstructured natural language data record may be associated with a free-form textual input box and may not require that the personnel manager user provide predefined data.

At operation 204, the processor generates a structured dataset based on the plurality of unstructured natural language data records. The structured dataset may include a frequency value associated with respective terms of each of the plurality of unstructured natural language data records.

As an illustrating example, the processor may apply a bag-of-words model to the plurality of unstructured natural language data records and generate a structured dataset in the form of a matrix X. In the matrix X, each row i may be associated with an unstructured natural language data record and each row j may be associated with a term or an n-gram (where n is greater than 1) in the corpus of textual input of the plurality of unstructured natural language data records. Accordingly, a value found at $X_{ij}$ of the matrix X may indicate a number of times (e.g., frequency) that the term or n-gram j appeared in the unstructured natural language data record i.

For instance, if the data record management system 120 received 1,345 manager comments (e.g., 1,345 unstructured natural language data records), the structured dataset (e.g., matrix X) may include 1,345 rows. $X_{20}$ refers to row 20 in the dataset of 1,345 manager comments. Further, if the plurality of unstructured natural language data records included 5,000 unique terms or n-grams, $X_{20,5}$ refers to the $20^{th}$ unstructured natural language data record in the plurality and the 5th unique term or n-gram.

At operation 206, the processor transforms the structured dataset to normalize the respective frequency values based on inverse proportionality of the respective frequency values.

In some embodiments, transforming the structured dataset to normalize the respective frequency values includes generating a Term Frequency-Inverse Document Frequency (TF-IDF) matrix based on the structured dataset. For example, the TF-IDF matrix may have the same number of dimensions as the structured dataset (e.g., matrix X). The TF-IDF matrix may include values that have been normalized based on weights such that values associated with terms or n-grams appearing frequently within the plurality of unstructured natural language data records may have a lower value than values associated with terms or n-grams appearing less frequently within the plurality of unstructured natural language data records.

For example, if word A="and" and word B="breach", based on a bag-of-words model, word A may appear 100 times in a plurality of unstructured natural language data records and word B may appear 7 times in the plurality of unstructured natural language data records. Upon the processor conducting operation 206, the values corresponding to word A and word B, respectively, may be normalized and be inverted such that the resulting value associated with the word B has a greater value that the resulting value associated with the word A. Accordingly, commonly occurring terms or n-grams (e.g., terms that may contribute low semantic meaning, such as words found in English stop words lists) are not associated with a great importance measure as compared to less commonly occurring terms or n-grams in the plurality of unstructured natural language data records.

For each of the unstructured natural language data records, the processor, at operation 208, determines a redundancy prediction value associated with that unstructured natural language data record based on the transformed structured dataset.

In some embodiments, determining a redundancy prediction value may include determining a cosine similarity value between that unstructured natural language data record and one or more other unstructured natural language data records in the plurality of unstructured natural language data records. Continuing with the above example, each row in the structured dataset (matrix X) may be associated with an unstructured natural language data record (e.g., employee performance review comment) and each value within the row of the matrix X may include a weighted value of frequency that a particular term/n-gram appears in the corpus of terms/n-grams of the plurality of unstructured natural language data records. Accordingly, respective rows of the matrix X may be a vector or a list of values indicating importance of a particular term/n-gram in the respective row. When a particular term/n-gram does not appear in a particular comment associated with a row, a value of 0 may be assigned. When the corpus of terms/n-grams may be large and the matrix may include several 0 values.

In some examples, the cosine similarity may be associated with an angle between two vectors and may be a value between 0 and 1 for specifying the degree of similarity between the two vectors based on their angle of direction. The cosine similarity of two given rows of the transformed structured dataset may provide a similarity measure of the respective unstructured natural language data records (e.g., employee performance review comments). For instance, a cosine similarity value closer to 1 may indicate that respective unstructured natural language data records being compared may be very similar to each other.

At operation 210, the processor generates a communication signal for displaying on a graphical user interface a message identifying one or more unstructured natural language data records being associated with a redundancy prediction value greater than a threshold value.

The respective unstructured natural language data records (e.g., employee performance review comments) may be compared such that comments associated with a cosine similarity value greater than a threshold value (e.g., near the value 1) may be identified as possibly being substantially copied and pasted by a personnel manager into numerous performance review textual input boxes associated with different employee users or between several performance review goals of a particular employee. The embodiments described herein may conduct operations to identify such template or substantially copied/pasted comments as non-meaningful content.

In the following example, the processor may generate a redundancy prediction value for indicating that a personnel manager user may have copied and pasted textual input across two or more performance review goals for a given employee:

| Employee Goal | Personnel Manager Comment (e.g., textual input) |
|---|---|
| Goal 1: Market Share/Revenue/Deliver financial results that meet or exceed plan | Very strong Australian revenues in FY18 and a broader business mix |
| Goal 2: Strengthen existing & establish new client relationships, calling intensity and quality. | Very strong Australian revenues in FY18 and a broader business mix |

In another example, the processor may generate a redundancy prediction value for indicating that a given personnel manager user may have potentially copied and pasted textual input for performance reviews of natural language data records associated with two or more distinct employees:

| | |
|---|---|
| Employee A: Goal = Capital Markets Risk Conduct Goals | Manager Comment for Employee A: Christian leads by example with respect to the risk and business control procedures and requirements and holds his team to his high standards. Christian is thoughtful and diligent about risk and risk mitigation and proactive in designing, implementing and monitoring the various business control tools. |
| Employee B: Goal = Capital Markets Risk Conduct Goals | Manager Comment for Employee B: Rob leads by example with respect to the risk and business control procedures and requirements and holds his team to his high standards. Rob is thoughtful and diligent about risk and risk mitigation and proactive in designing, implementing and monitoring the various business control tools |

In another example, the processor may generate a redundancy prediction value for indicating that a given personnel manager may have potentially substantially copied and pasted textual input for performance reviews of natural language data records associated with two or more distinct employees, subject to minor terminology modifications:

| | |
|---|---|
| Employee A: Goal = Leadership Behaviours | Manager Comment for Employee A: Good progress on implementing Leadership Behaviours. |
| Employee B: Goal = Leadership Behaviours | Manager Comment for Employee B: Good progress on attaining Leadership Behaviours. |

In some examples, it may be desirable to identify data record authors (e.g., personnel manager users) creating data records that substantially focus on a sole topic or category to the exclusion of other topics or categories. In some other examples, it may be desirable to identify data records that may be generic or lack substantive detail. In some embodiments, operations for identifying data records that may be generic or lack substantive detail may include operations for identifying: a number of unique words in an unstructured natural language data record; a total number of unique words used by an author user; number of words used within the unstructured natural language data record; percentage of the unstructured natural language data record containing punctuation; percentage of words of the unstructured natural language data record that are English stop words; number of adverbs/verbs/nouns/adjectives included in the unstructured natural language data record; number of topics/categories/employee review goals associated with textual input (e.g., comment); or average word or character length of the unstructured natural language data record.

In some embodiments, the systems and methods described herein may conduct operations for topic modelling to identify themes/topics/categories of text within the plurality of the unstructured natural language data records. The operations may identify data record authors who provide textual input that may be focused on a specific theme/topic/category, but an expected textual input is unrelated to said specific theme/topic/category.

For example, for each of the unstructured natural language data records, the processor may determine a topic prediction value associated with that unstructured natural language data record. The topic prediction value may be based on topic modelling including non-Negative Matrix Factorization. In the present example, the processor may transform TF-IDF matrix based on non-Negative Matrix Factorization to generate two matrices W and H. The matrix W may include as many columns as a number of topics and each row in the matrix W may be associated with a unique term/n-gram (e.g., corresponding to respective columns of the TF-IDF matrix). The matrix W may include values representing a probability that the respective terms/n-grams is associated with the respective topics. For each row in the matrix W, the probability values sum to 1. The matrix H includes values associated with a probability of each topic being associated with a respective unstructured natural language data record (e.g., an employee performance review comment). The topic prediction value may be associated with a topic that had a highest probability of being associated with the particular unstructured natural language data record (e.g., employee performance review comment).

As an illustrating example, the number of topics may be defined as three, where the set of topics may include a General topic, a Conduct topic, and a Financial topic. The processor may conduct operations to identify a set of terms that may be associated with identification of respective topics. For instance, top 20 terms associated with various topics may include:

| Topic | Common Terms/n-Grams associated with Topic |
|---|---|
| General | team, year, business, good, well, strong, also, work, 2019, key, bankname, focus, leadership, new, great, continue, management, time, working and role. |
| Conduct | risk, issues, standards, conduct, culture, compliance, control, monitoring, policies, business, professional, diligent, risks, audit, market, highest, reg, proactive, requirements and bankname. |
| Financial | client, sales, trading, clients, revenue, fx, desk, electronic, base, market, plan, business, performance, global, equity, strategy, accounts, relationships, engagement and cash. |

The following are examples of employee goals and personnel manager user comments that may be associated with the respective defined topics:

Topic: GENERAL
Employee Goal: Partner with the business and increase the visibility and contribution of Product Control in business analysis and value added initiatives. Support other areas e.g. Corporate Treasury, Performance Management etc. in progressing cross functional initiatives Personnel Manager Comment:
Good engagement with the business during the year particularly in the second half of the year. The MI provided to the business is consistently of a high standard. His team have worked well with other parts of Finance in helping on specific initiatives and issues eg Rates capital optimisation in Organization. The integration with Valuations will provide more opportunities for providing coordinated and value added support to the European businesses Topic: Conduct
Employee Goal: Capital Market Risk Conduct Goal all employees Personnel Manager Comment:
Professional standards remain exemplary and Chris is a trusted colleague and can be relied upon to do the right thing for our clients, employees and for the organization. In terms of risk control, as the NBC process is a crucial forum to both enable new businesses and also ensure that the appropriate controls are in place. His deep experience and knowledge in Banking makes him a very effective leader and Chair of that committee Topic: Financial
Employee Goal: Increase volume of tickets won for sales desk Personnel Manager Comment:
Organization's ability to connect with clients, advertise inventory and trade seamlessly as the market electronifies is key. James' management of this process, design vision and harnessing Tim's ability and experience have resulted in many positive outcomes. Top 5 platform rankings in Europe in the face of a much lower budget than our competitors can only be achieved through partnership. James' multi function background is ideally suited to deliver solutions in a cost effective manor. Now that APS is truly global and the e-commerce function in credit has been more clearly articulated, there is genuine upside in other regions for electronic trading via client connection and profit opportunities.

In some embodiments, non-Negative Matrix Factorization may be conducted using a scikit-learn (version 0.21.2) package and Python code may be used to import models from a Python package sklearn.decomposition. The non-Negative Matrix Factorization model parameters may include: n_components=3, specifying a number of topics; alpha=0.1, determining intensity of the regularization of the model; l1_ration=0.5, specifying a combination of L1 (lasso) and L2 (ridge) regularization. Using the scikit-learn package is one example and other operations or implementations for conducting non-Negative Matrix Factorization may be contemplated.

Accordingly, at operation 208, the processor may determine a redundancy prediction value for an unstructured natural language data record based on a relative number of data records in the plurality of data records having the topic prediction value of the subject unstructured natural language data record. For example, if a processor conducts operations to determine that a large majority of the number of unstructured natural language data records that are associated with a particular data record author (e.g., data records received from a particular source device 110) are associated with a "financial" topic, the determined redundancy prediction value may indicate that a data record may be associated with a financial topic even when the unstructured natural language data record is for addressing a different topic.

In the following example, the processor may generate a redundancy prediction value indicating that a personnel manager user may have substantially copied and pasted textual input for employee goals associated with different topics or goal categories:

| Employee Goal | Personnel Manager Comment (e.g., textual input) |
| --- | --- |
| Goal 1: Profitability, Balance Sheet & Expense Management | Sanjeev has a sound view on credit risk. He asks questions that are perceptive and relevant and always, in my view, helps the team form a better view on the risks and rewards of a deal |
| Goal 2: Capital Market Risk Conduct all employees | Sanjeev has a sound view on credit risk. He asks questions that are perceptive and relevant and always, in my view, helps the team form a better view on the risks and rewards of a deal.his opinion is valued by Levfin, Corp Banking and GRM and he is trsuted by his US colleagues. ed |

In the present example, one of the employee goals is associated with a financial related goal and the other of the employee goals is associated with a conduct related goal; however, a substantial portion of the textual input for the respective natural language data records are similar. Accordingly, the processor may generate the redundancy prediction value to indicate that the respective unstructured natural language data records may include on-meaningful textual content, at least, because the textual input may not be suitable as a comment on both employee goals.

In some embodiments, a set of topics may be predefined (e.g., k=3 topics: General, Conduct, and Financial topics). Thus, in the examples described above, there may be three topic prediction values. Although k=3 topics is described, any other number of topics may be contemplated for the systems and methods described herein.

In some embodiments, the processor may receive, from the source device 110 or an administrator device, user specified terms or n-grams that may be associated with a particular topic for calibrating or training operations for identifying topic prediction values, such that the data record management system 120 may more accurately generate redundancy prediction values for identifying non-meaningful or redundant data records.

In some embodiments, determining the redundancy prediction value may include determining whether the topic prediction value associated with an unstructured natural language data record is similar to a data record category associated with that unstructured natural language data record. For example, an unstructured natural language data record may be configured to store a natural language textual input for an employee performance review goal: "Leadership behaviours". The processor may generate a redundancy prediction value to indicate that the unstructured natural language data record includes non-meaningful content if the topic prediction value associated with that unstructured natural language data record may indicate a "financial" topic (e.g., a "financial" topic is unrelated or tangentially related to "leadership behaviours").

As described, managing large volumes of unstructured natural language data records may be challenging. In some embodiments, the data record management system 120 may be configured to generate signals for visually representing and displaying data associated with the plurality of unstructured natural language data records.

The examples described herein describe topic modeling based on Non-Negative Matrix Factorization; however, other operations for topic modelling may be contemplated. For example, generating topic prediction values may be based on operations of K-means clustering or agglomerative clustering.

Figure 3:
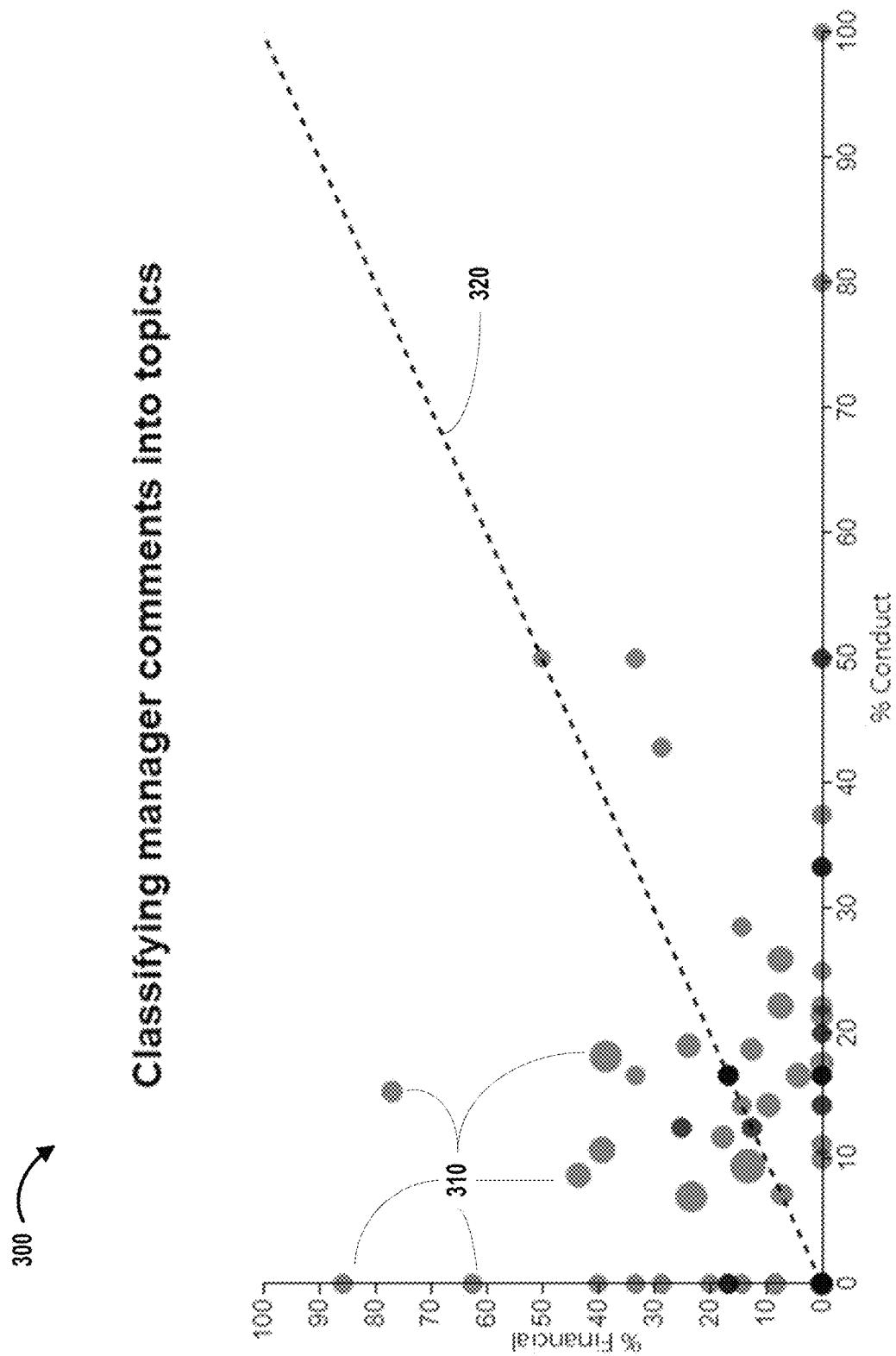
FIG. 3 illustrates, in a graph, an example of categorized unstructured natural language data records, in accordance with some embodiments.

Reference is made to FIG. 3, which illustrates in a graph 300, an example of categorized unstructured natural language data records, in accordance with some embodiments. The unstructured natural language data records may be associated with comments provided by personnel manager users. The graph 300 includes axis associated with percentage of conduct related unstructured natural language data records or comments and associated with percentage of financial related unstructured natural language data records.

In an example, a data point 310 (e.g., circular shape or data marker) on the graph 300 may be associated with a number of comments made by a particular personnel manager user, and a relative diameter of the circular data marker 310 may be associated with a relative number of comments for that particular personnel manager user. For example, a larger circular marker 310 may indicate a larger number of comments provided by a particular personnel manager user than a comparatively smaller circular marker 310.

In some examples, the circular data markers 310 may be colour coded with varying shades of colour. For instance, a darker colour (e.g., red, dark blue, black, etc.) may indicate that the circular data marker 310 is associated with a greater number of personnel manager users, while a lighter colour (e.g., pink, light blue, grey, etc.) may indicate that the circular data marker 310 may be associated with one personnel manager user.

In FIG. 3, the respective circular data markers 310 may indicate a percentage of unstructured data records associated with conduct topics (e.g., x-axis), and a percentage of unstructured data records associated with financial topics (e.g., y-axis) for a respective personnel manager user.

In some examples, it may be desirable for personnel manager users to transmit natural language data records (e.g., employee performance review comments) to the data record management system 120 that include a substantially similar number of financial related and conduct related comments. In FIG. 3, circular data markers 310 along the hashed line 320 may indicate that the personnel manager users associated with these circular data markers 310 have provided natural language data records that include approximately similar number of financial related and conduct related comments.

In contrast, circular data markers 310 that may not be along the hashed line 320 may be associated with managers who may provide natural language data records that focus on financial related topics (e.g., above the hashed line 320 illustrated in FIG. 3) or that focus on conduct related topics (e.g., below the hashed line 320 illustrated in FIG. 3).

In the example illustrated with reference to FIG. 3, the data record management system 300 may generate signals for visually identifying a ratio of performance review comments associated with financial related topics to conduct related topics for particular personnel manager users.

Figure 4:
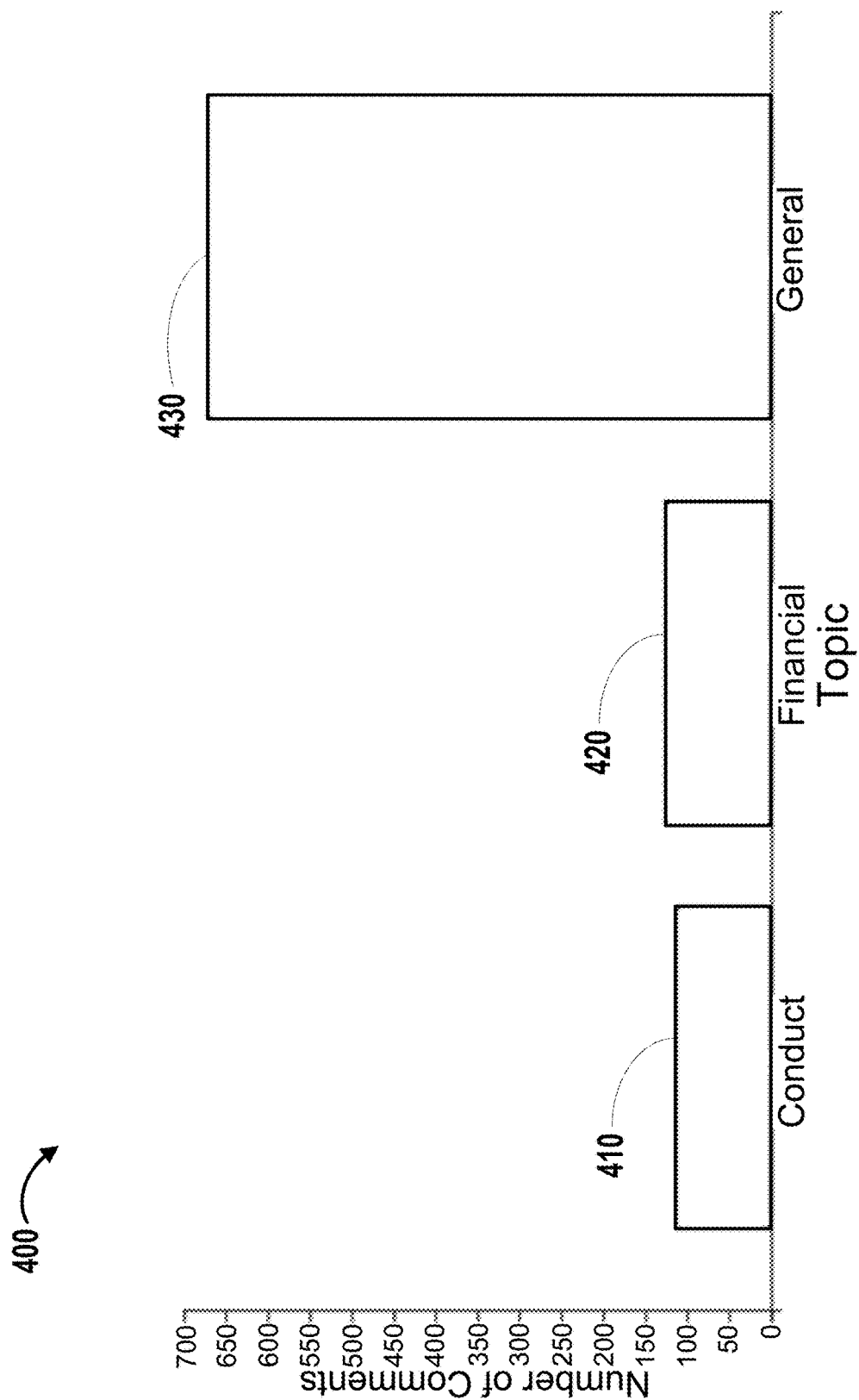
FIG. 4 illustrates, in a graph, an example of frequency of topics identified among a plurality of unstructured natural language records, in accordance with some embodiments.

Reference is made to FIG. 4, which illustrates, in a graph 400, an example of frequency of topics identified among a plurality of unstructured natural language data records, in accordance with some embodiments. For example, the data record management server 120 may be configured to determine a topic prediction value associated with respective unstructured natural language data records, as described herein, and to generate a signal for displaying the graph 400 to illustrate the relative number of unstructured natural language data records associated with each of the three topics (e.g., General 430, Conduct 410, Financial 420).

In some embodiments, where the number of unstructured natural language data records associated with the General 430 topic may be disproportionally greater than the Conduct 410 or Financial 420 topics, a personnel manager user or an administrator user of the data record management system 120 may provide parameters for refining the topical categorization of unstructured natural language data records based on key terms/n-grams.

Figure 5A:
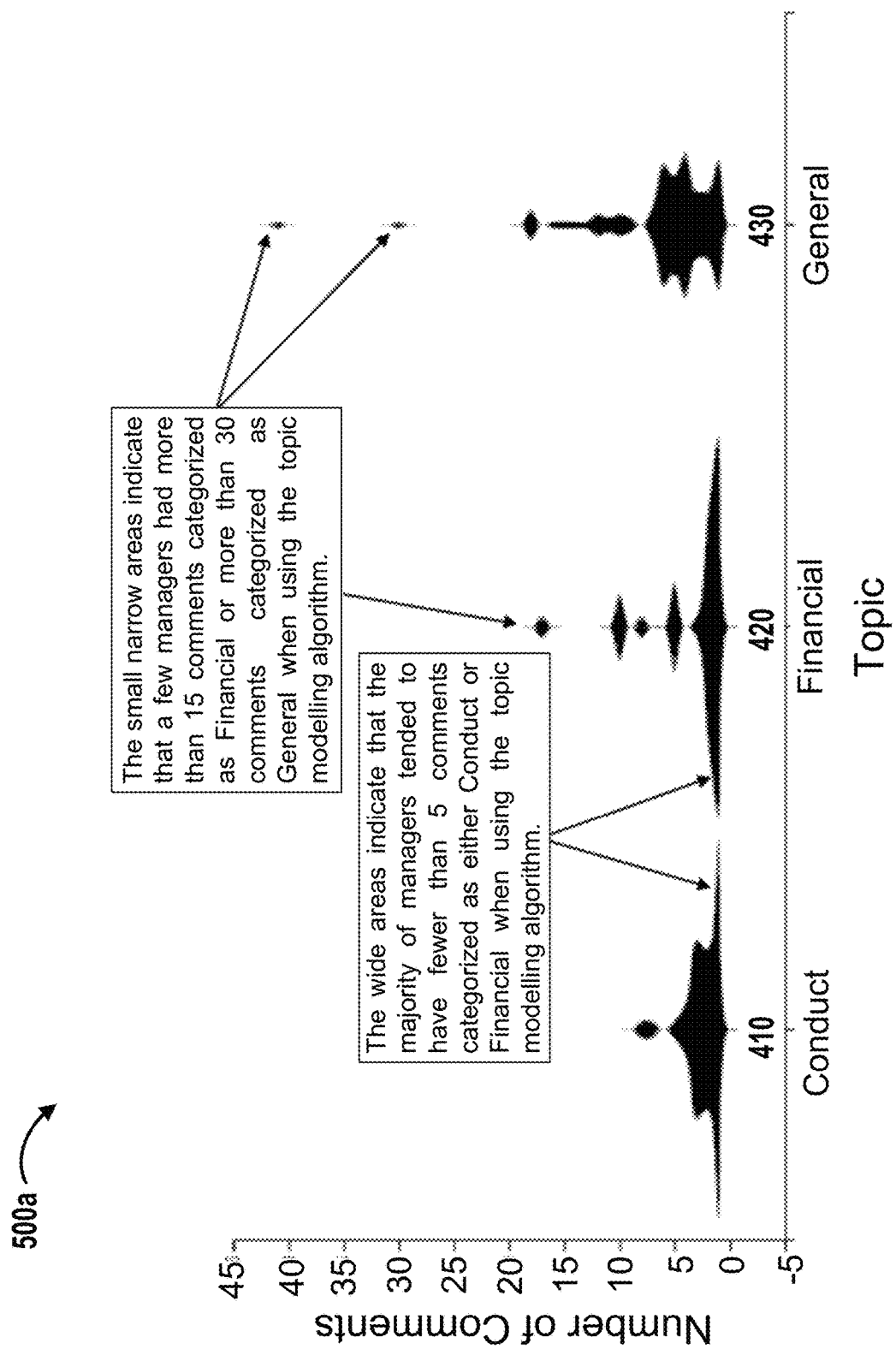
FIG. 5A illustrates, in a graph, an example of frequency of topics identified among a plurality of unstructured natural language records, in accordance with some embodiments.

Reference is made to FIG. 5A, which illustrates, in a graph 500a, an example of frequency of topics identified among a plurality of unstructured natural language data records, in accordance with some embodiments. For example, the graph 500a may indicate the number of natural language data records (e.g., comments) associated with the respective topics. Further, the graph 500a may indicate a relative number of personnel manager users who may have provided comments within the respective topical categories.

For instance, in the graph 500a of FIG. 5A, a wider graphical feature may indicate that a majority of managers tended to provide fewer than 5 comments categorized as either Conduct 410 or Financial 420, based on the example operations described herein. In another example, a narrower graphical feature may indicate that fewer number of managers had more than 15 comments associated with a Financial 420 topic or more than 30 comments associated as a General 430 topic, based on the example operations described herein.

Figure 5B:
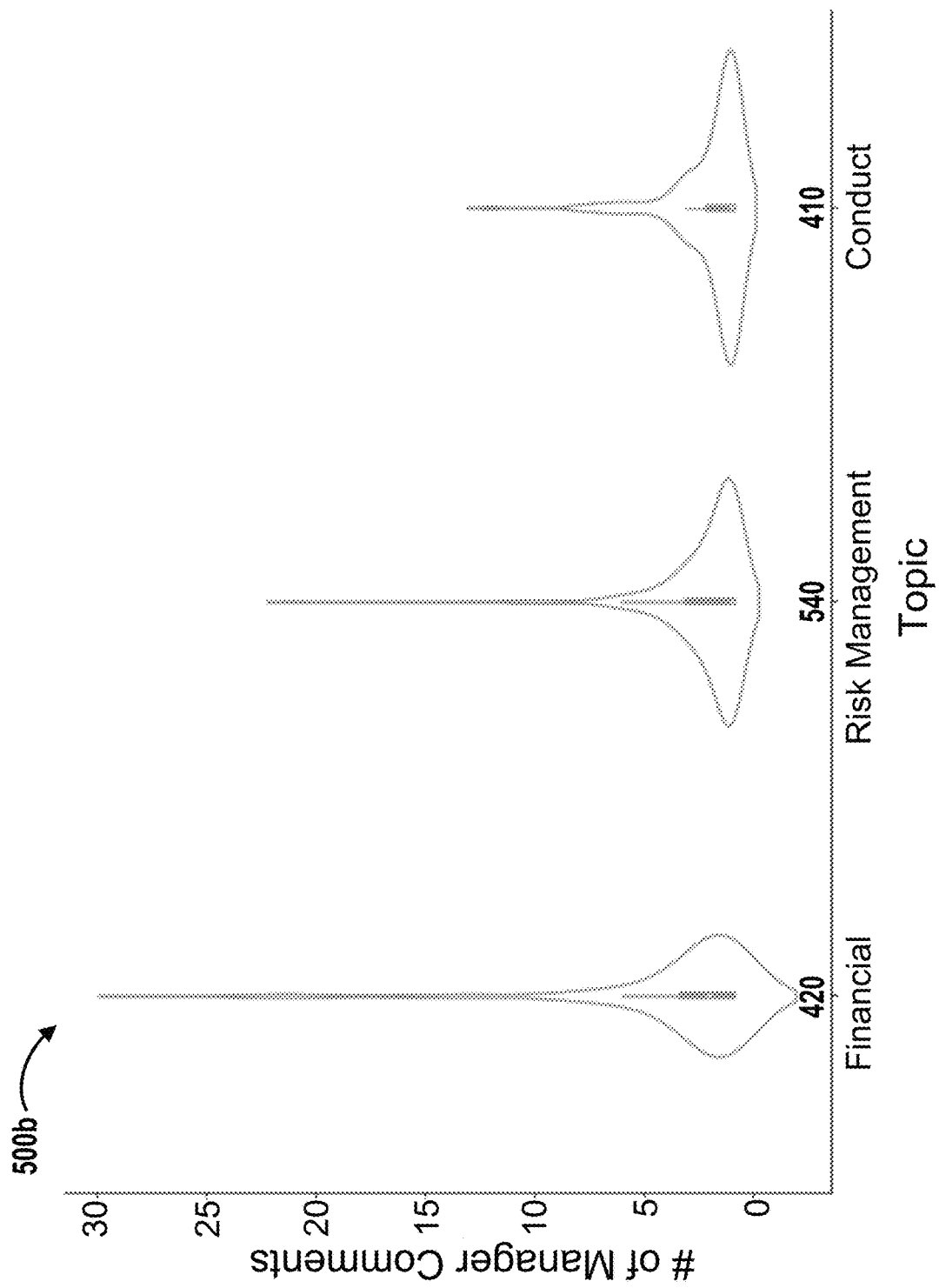
FIG. 5B illustrates, in a graph, another example of frequency of topics identified among a plurality of unstructured natural language records, in accordance with some embodiments.

FIG. 5B illustrates, in a graph 500b, another example of frequency of topics identified among a plurality of unstructured natural language data records, in accordance with some embodiments. The topics shown in this graph 500b include Financial 420, Risk Management 540, and Conduct 410.

In an illustrating experiment, a plurality of unstructured natural language data records were analyzed by an example data records management system 120 described herein. The plurality of unstructured natural language data records included contributions from 109 personnel manager users. Upon conducting example operations described herein, the data records management system 120 identified:

- 13 personnel manager users who potentially copied and pasted comments between employee goals;
- 35 personnel manager users who generated data records (e.g., comments) for two or more employees, of which 5 of the personnel manager users potentially copied and pasted comments between data records of different employees; and
- at least two personnel manager users were identified as having generated data records associated with a financial topic for employee goas associated with conduct risk topics.

Further, in the conducted experiment, the data records management system 120 identified 83% of personnel manager user generated data records (e.g., comments) relating to a "Profitability, Balance Sheet & Expense Management" goal as having less than 10 unique words (e.g., potentially non-meaningful), and 78% of personnel manager user generated data records relating to "Year-End Assessment" goal as having greater than 51 unique words.

In some embodiments, themes and/or topics in a corpus of performance review statements may be located and analyzed to assess the quality and robustness of the performance reviews. In some embodiments, a "theme" may be defined as an important term for a topic. For example, the words "good", "performance", "year", etc. may be detected in a review. Words reflecting positive or negative sentiments may also be detected (e.g., "good", "poor", etc.). Words reflecting managerial context for topics (such as financial context or conduct context) may also be detected.

In some embodiments, a proper performance review would comprise approximately equal numbers of financial context commentary as conduct context commentary. Reviews may be classified as properly prepared or not. In some embodiments, review the system may automatically notify the reviewer that that a review does not meet a standard (e.g., approximately equal number of financial and conduct commentary). In some embodiments, such review classification may be collected across a company and analyzed for manager performance reviews and/or identifying review managers that require training.

In some embodiments, employee reviews that include negative commentary (e.g., commentary that indicates a threshold level of risky conduct, poor financial performance, etc.) may be sent to a human resources officer or risk assessment officer.

In some embodiments, yearly trends may be collected for trend analysis purposes. I.e., rather than sampling a small number of reviews and extrapolating a trend, the system may determine from all employee reviews if manager reviews (and/or employee performance) are improving over time. For example, statistical analysis of the percentage of manager reviews that provide approximately equal numbers of conduct vs financial commentary may be obtained for an entire organization and/or divisions of the organization. Such trends may assist with determining if further training (or other incentives) are needed to adjust performance review quality.

In some embodiments, the system may identify if there is too high of a correlation of higher compensation for higher ratios of positive financial comments vs. positive conduct comments. This could assist in determining if compensation awards are consistent with achievement of both conduct and financial goals (rather than just financial goals).

In some embodiments, the system may assist with determining if a compensation increase is justified for an employee. For example, if one division in an organization has a higher level of highly rated performance reviews than the overall organization average, compensation increase request for that division may be sent to a next level review to determine if the division over-performed or if the evaluations are artificially high.

In some embodiments, the system may analyze if an employee review was not performed properly. For example, a reported conduct breach was not mentioned in the employee's annual review, similar comments from other employee reviews appear to be simply copied and pasted, etc.

Figure 6:
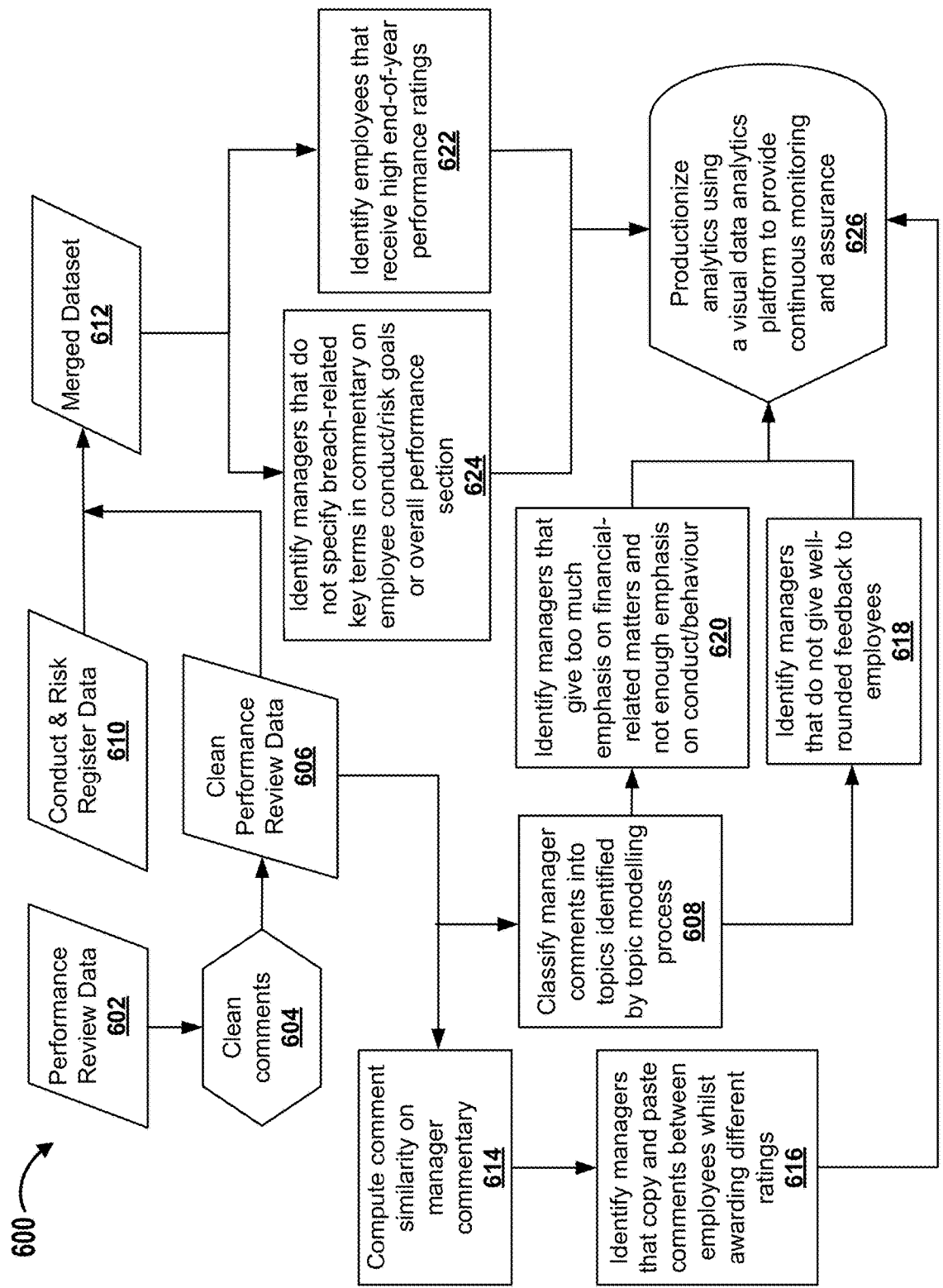
FIG. 6 illustrates, in a flowchart, an example of a method of evaluating a performance review, in accordance with some embodiments.

FIG. 6 illustrates, in a flowchart, an example of a method of evaluating a performance review 600, in accordance with some embodiments. At operation 602, performance review data is obtained. At operation 604, comments are cleaned. For example, English stop words may be removed, empty comments may be detected and a request for such comments may be sent to the reviewer, punctuation may be cleaned, text may be normalized and/or lemmatized. At operation 606, performance review data may be obtained. The results of operation 606 may be sent to operations 608, 612 and 614.

At operation 608, manager comments may be classified into topics identified by a topic modelling process. For example, unsupervised learning may be performed using TF-IDF and Non-negative Matrix Factorization. The results of operation 608 may be sent to operations 618 and 620.

At operation 610, conduct and risk register data may be obtained. At operation 612, performance review data, and conduct and risk register data may merged into a dataset. The results of operation 612 may be sent to operations 622 and 624.

At operation 614, comment similarity may be determined from the manager commentary. For example, cosine similarity and TF-IDF may be used to determine a comment similarity metric. At operation 616, the comment similarity in reviews of each employee may be used to identify managers that copy and paste comments between employees whilst awarding different ratings. These results may be sent to operation 626.

Results from operation 608 may be used at operation 618 to identify managers that do not give well-rounded feedback to employees. These results may be sent to operation 626.

Results from operation 608 may also be used at operation 620 to identify managers that give too much emphasis on financial-related matters and not enough emphasis on conduct/behaviour matters. These results may be sent to operation 626. It should be noted that some regulatory expectations are such that material risk takers are to receive an equal ratio of financial-related and conduct-related commentary in their performance review to justify their compensation and/or compensation increases.

The merged dataset from operation 612 may be sent to operation 622 to identify employees that receive high end-of-year performance ratings. For example, employees that have committed serious breaches should not receive top performance ratings. Results may be sent to operation 626.

The merged dataset from operation 612 may be sent to operation 624 to identify managers that do not specify breach-related key terms in commentary on employee conduct/risk goals, or n an overall performance section. Results may be sent to operation 626.

Results from operations 616, 618, 620, 622, and 624 may be sent to operation 626 where the analytics may be productionized using a visual data analytics platform (e.g., Tableau™) to provide continuous monitoring and assurance. For example, an internal audit can monitor the effectiveness of human resources (HR) controls whilst the business (HR and Compliance) can quickly identify managers/employees whose performance review process need to be inspected by the business.

In some embodiments, topic modelling may be applied to the comments made by managers and not those made by employees. One purpose of a topic modelling exercise is to identify if any managers had not given full-rounded performance reviews in their commentary; for instance, if there any managers whose commentary on employees are solely financial related without much commentary on conduct-related behaviours. This type of scenario may apply more to those managers that work in a front office environment.

Similar to the comment similarity analysis that may be performed, comments that contained too few words are removed so that the corpus of comments did not contain too much noise. The following is an example topic modelling analysis:

```
# find the number of unique words in the corpus of manager comments
all_words = Counter([i for el in manager_df.CleanComment_full.str.split( ).tolist( ) for i in el])
```

```
# Use Initialise the Non-negative Matrix Factorization algorithm
nmf_model = NMF(n_components=20, random_state=1, l1_ratio=0)
# Prepare tfidf vectorizer
tfidf_vect = TfidfVectorizer(max_df=0.9, min_df=5, ngram_range=(1,2),
sublinear_tf=True, norm='l2')
# filter out lowest word counts
manager_df = (manager_df[manager_df.CleanComment_full.str.split( ).str.len( ) >
    manager_df.CleanComment_full.str.split( ).str.len( ).quantile([.1])
    .values[0]])
# vectorize the comments into a numerical matrix where each row is a comment, and
each column is a unique term in the corpus of comments.
# the values in the matrix represent the weight (importance) of the term within a
particular comment. Common words are given lower weights/importance.
tfidf_comments = tfidf_vect.fit_transform(manager_comments_prepared).toarray( )
```

The output from the topic modelling analysis is displayed below. Topic modelling is an unsupervised machine learning (ML) technique. An unsupervised learning model requires the modeller to provide the number of topics to identify in the corpus of comments. Therefore, if 100 was set as the number of topics to identify, the model would reveal 100 topics in the corpus.

However in a dataset such as the one that is being analyzed here, a topic model that is parameterized to identify such a high number of topics, would end up showing topics that were very similar to other topics in the dataset as well as topics that may be considered too granular and therefore not really topics at all.

The number of topics to be identified should not be too small else some key themes may not be captured in the model. In one example, for the topic model that was applied to the manager comment corpus, 20 topics were chosen to be identified. This number was part of an iterative process that involved testing the topic results and then altering the parameters of the model, before reapplying the model back onto the data. However even when the reader views the results of the analysis below, it will be apparent that some of the topics identified are hard to distinguish and some contain too much noise.

It should be noted that the model does not choose the name for each topic, instead each topic is assigned a unique number from zero to n where n is the number of topics. It is the responsibility of the person applying the model to choose how a topic should be named. Of course, a domain expert could also be asked to supply suitable topic labels. The topic modelling algorithm that was used for this example analysis was Non-negative Matrix Factorization (NMF):

```
# fit the NMF model to the tfidf comments
nmf_results = nmf_model.fit_transform(tfidf_comments)
topics = [ ]
# classify the terms into the topic that they have the highest probability of
belonging to for n in range(nmf_results.shape[0]):
    topics.append(nmf_results[n].argmax( ))
print("Topics in NMF model:\n")
tfidf_feature_names = tfidf_vect.get_feature_names( )
print_top_words(nmf_model, tfidf_feature_names, 30)
```

Example topics in NMF model:
Topic 0:
need, always, time, help, get, thing, make, way, work, sure, know, take, right, think, task, others, come, willing, make sure, able, question, something, really, one, ask, much, feel, go, keep, learn Topic 1:
risk, management, risk management, issue, control, framework, operational, regulatory, operational risk, compliance, conduct, management framework, understanding, limit, tax, appropriate, aware, bankname risk, awareness, concern, escalate, risk issue, enterprise, audit, potential, requirement, appetite, mitigate, risk appetite, credit Topic 2:
revenue, market, desk, sale, trading, product, year, focus, platform, target, strong, europe, european, global, coverage, cross, growth, trade, need, performance, overall, equity, book, term, plan, rate, execution, number, franchise, increase Topic 3:
bankname, professional, professional standard, policy, standard, conduct, always, procedure, highest, policy procedure, interest, best interest, highest professional, act, best, interest name, bankname client, code conduct, code, bankname code, high professional, manner, act best, adopts, adheres, bankname policy, always act, escalates, abides, judgement Topic 4:
client, service, relationship, client service, meeting, client relationship, client base, base, new client, experience, feedback, client experience, coverage, received, contact, client meeting, satisfaction, excellent, internal, bankname, client need, portfolio, strategic, account, client satisfaction, positive, relationship client, client contact, fiduciary, service client Topic 5:
forward, look, look forward, forward working, working, year, next, next year, looking, looking forward, year look, seeing, forward seeing, coming, going, coming year, going forward, contribution, thank, team look, career, continue, goal, working next, opportunity, team, really, growing, great, challenge Topic 6:
would, like, would like, see, like see, year would, like thank, continue, take, would also, encourage, next, forward would, also like, focus, next year, would encourage, see continue, area, team would, coming, think, knowledge, opportunity, year, develop, great see, also, see take, coming year Topic 7:
done, well, job, great, well done, great job, done great, good job, really, done good, great year, work done, excellent, done well, year, excellent job, great work, job done, fantastic, get, done excellent, year well, managing, team, team well, outstanding, job managing, received, getting, work Topic 8:
feedback, positive, leadership, management, people, development, focus, skill, team, area, manager, eos, strong, opportunity, develop, meeting, plan, continue, result, score, year, approach, direct, communication, lead, support, challenge, received, performance, leader Topic 9:
project, delivery, delivered, involved, initiative, number, migration, year, key, many, worked, skipper, requirement, bau, deliver, ukulele, also, support, change, testing, lead, project team, successful, implementation, managed, significant, scuba, successfully, program, contribution Topic 10:
member, team, team member, member team, junior, valued, well, within, training, valued member, within team, key member, also, team well, staff, junior member, knowledge, mentor, junior team, help, team player, team work, player, senior, time, highly, well team, new team, coaching, colleague Topic 11:
hard, work, hard work, thank, year, thank hard, worked, worked hard, work year, thanks, support, much, challenging, work hard, pleasure, dedication, effort, well, great, thanks hard, done thank, challenge, throughout, really, appreciated, like thank, team, commitment, another, pleasure work Topic 12:
business, relationship, partner, across, key, build, strong, well, stakeholder, global, built, working, business partner, bankname, group, colleague, support, initiative, network, collaboration, strong relationship, team, work, within, function, building, across business, working relationship, internal, various Topic 13:
role, new, new role, learning, change, learn, challenge, responsibility, knowledge, within, opportunity, taken, develop, take, played, start, skill, wish, play, model, new team, key role, role model, transition, taking, structure, support, team, experience, role within Topic 14:
high, standard, high standard, level, performance, high level, quality, high performance, high quality, work, work high, consistently, attention, detail, excellent, attention detail, rating, service, set, maintained, performing, quality work, high professional, outstanding, expectation, overall, performed, performance year, maintained high, accuracy Topic 15:
process, ensure, review, completed, procedure, training, reporting, also, control, required, report, team, time, timely, change, task, date, account, complete, data, information, worked, within, system, ensuring, issue, due, manner, deadline, meeting Topic 16:
good, progress, good work, good year, good job, good progress, made, understanding, relationship, good understanding, good relationship, work, made good, done good, year, good see, keep, job, good working, keep good, progress made, good example, really good, built good, working relationship, good feedback, see, important, team good, also good Topic 17:
comment, agree, end, goal, year end, agree comment, year, mid, mid year, rating, refer, note, please, check, year comment, see, track, check agree, noted, track year, outstanding, manager, end agree, amp track, comment amp, please refer, refer comment, comment made, period, comment noted Topic 18:
amp, rm, amp rm, initiative, opportunity, uk, bankname amp, bankname, amp team, support, wider, product, rm team, finance, investment, number, update, program, including, value, cm, review, team amp, cs, introduction, important, provided, compliance, banking, contribution Topic 19:
day, day day, activity, task, day activity, day work, responsibility, day task, day basis, work, desk, basis, daily, support, time, running, office, day process, day running, team, issue, debtor, demonstrates, operation, day role, tom, day management, day responsibility, every, day operation Looking at the key terms associated with each of the topics above, clear themes can be observed from the results of the model. There were themes around client relationships, risk, front office, learning & development and more. Each of these themes could be explored in more detail however for this purpose, only themes around front office, conduct and risk were considered.

With this, the topics that were of most interest, were topics 1, 2 and 3.

Topic 1 was considered as being risk management-related.

Topic 2 was considered as being front office/financial-related.

Topic 3 was considered as being conduct-related.

The next stage of the analysis focused on the manager comments that were categorized into one of the three topics.
    manager_df['CommentTopic']=topics
    topic_data=manager_df[manager_df.CommentTopic.isin([1,2,3])].copy( )
    topic_data['CommentTopic']=topic_data['CommentTopic'].map({1:'Risk Management', 2:'Financial', 3:'Conduct'})

During the topic modelling process, all 20 topics are assigned probabilities based on how likely each respective topic describes each comment. This forms a probability distribution for each comment as the sum of the probabilities must add to one. The topic that has the highest probability of being assigned to a comment is then selected. This may be seen as a way of clustering the comments into similar groups, such that the comments within the same group are more similar to each other than they are to comments that belong to other groups.

As an example, topic 4 may have a probability of 99% of belonging to comment n. Therefore the remaining 1% of probability would be distributed amongst the other topics.

There are other topic modelling algorithms such as a Gaussian Mixture Model that can assign multiple topics to a comment using joint probability distributions but these methods were not used for this analysis.

When filtering on the manager comments for those which fell into one of the three categories above, it was found that approximately 2,300 comments remained from the approximate 16,000 manager comments that were in the dataset.

Figure 7:
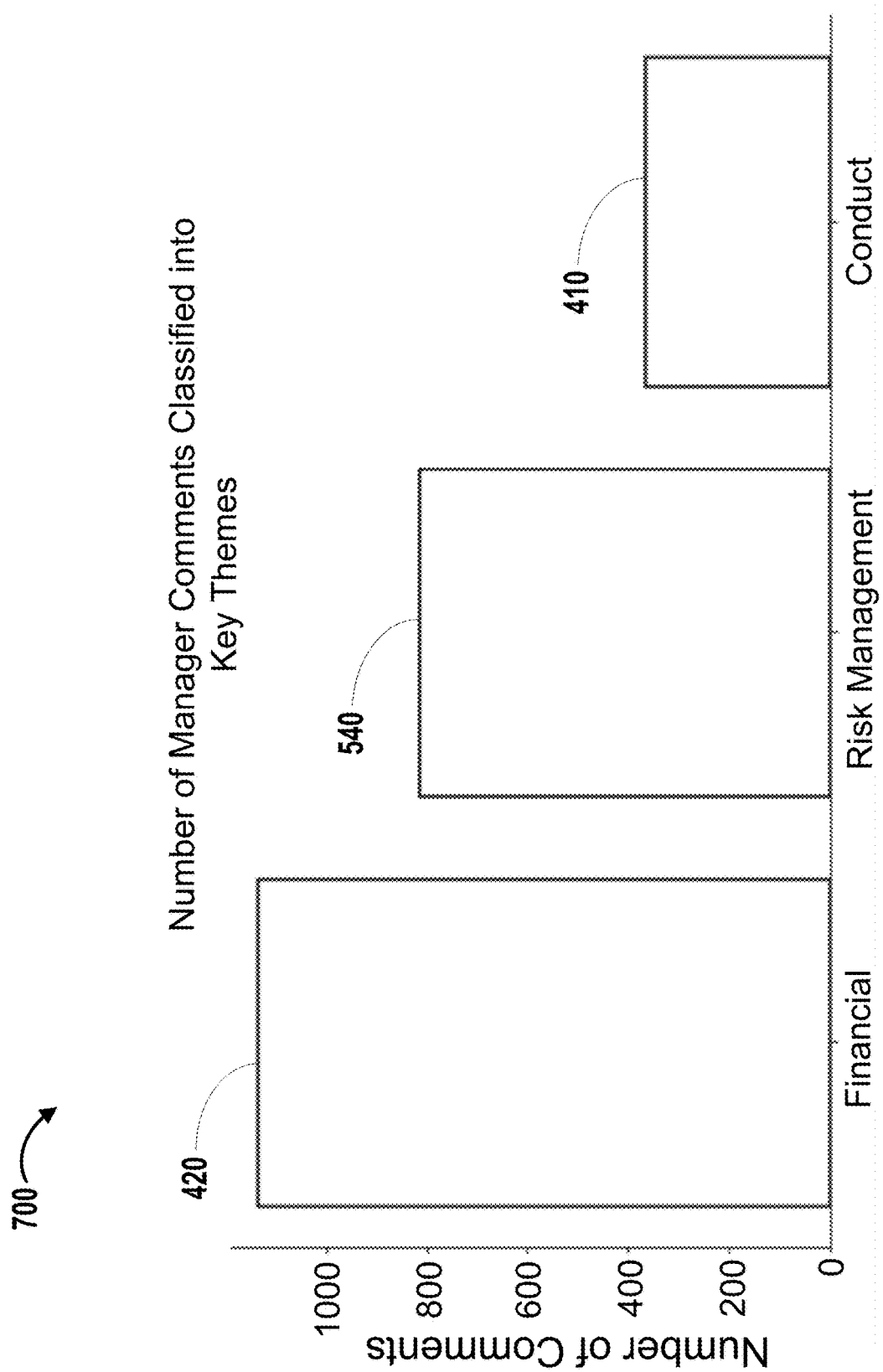
FIG. 7 illustrates, in a bar diagram, an example of a visualization output of manager comments classified into themes, in accordance with some embodiments.

The visualization in FIG. 7 shows that the most common topic of the three, was the financial related theme. FIG. 7 illustrates, in a bar diagram, an example of a visualization output of manager comments classified into themes 700, in accordance with some embodiments. In this example, the number of financial-related comments 420 is larger than then number of conduct-related comments 410. In some embodiments, a notification message may be sent to a review manager to indicate that the reviews should be investigated since the number of financial-related comments 420 does not approximately equal the number of conduct-related comments 410.
    # perform principal component analysis on the tfidf comments to reduce the dimensionality of the data (somewhere in the thousands) to 2 dimensions
    pca=PCA(n_components=2)
    tfidf_comments=pd.DataFrame(tfidf_comments)
    tfidf_comments['CommentTopic']=topics tfidf_topics=tfidf_comments[tfidf_comments.Comment-Topic.isin([1,2,3])]
pca_comments=pca.fit_transform(tfidf_topics.iloc[:,:-1])
use t-distributed stochastic neighbor embedding (a complex technique used to visualize high-dimensional data, particularly good for matrices that represent unstructured text data) to visualize the manager comments
tsne_results=TSNE(n_components=2).fit_transform (pca_comments)
topic_data['tsne_x']=tsne_results[:,0]
topic_data['tsne_y']=tsne_results[:,1]

Figure 8:
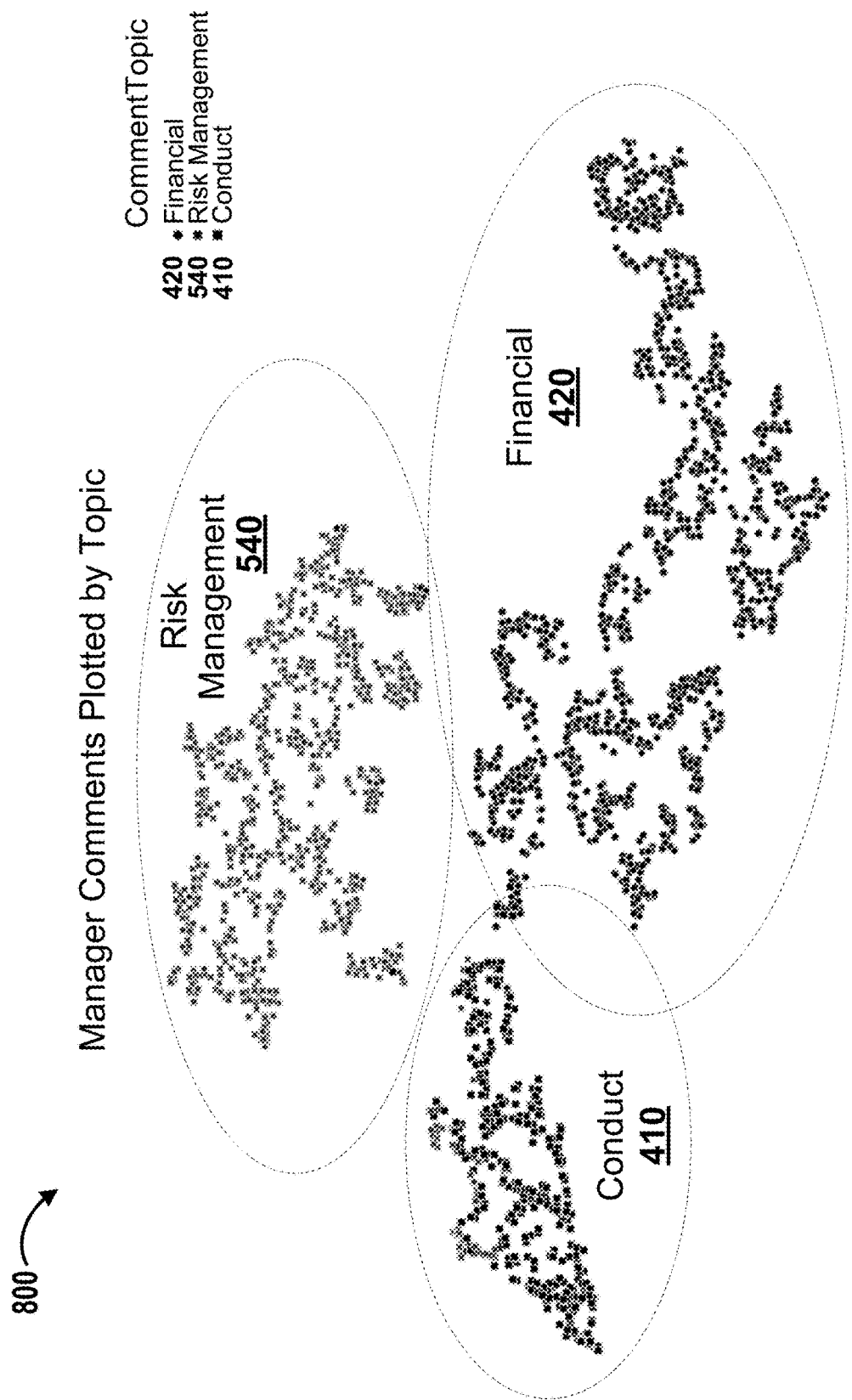
FIG. 8 illustrates, in a plot diagram, an example of a visualization output of manager comments plotted by topic, in accordance with some embodiments.

FIG. 8 illustrates, in a plot diagram, an example of a visualization output of manager comments plotted by topic 800, in accordance with some embodiments. Comments pertaining to risk management 540, financial 420 and conduct 410 are displayed in clusters. Each point in the plot represents a manager comment that has been classified into one of the three topics using feature dimensionality reduction techniques. The visualization shown in FIG. 8 represents each of the (approximately) 2,500 manager comments in 2-D space. The comments are color-coded based on which topic they were assigned to during the topic modelling exercise. In order to view the comments in this way, each comment was numerically transformed into row vectors and contained within a matrix. The dimensions of this matrix were reduced using a dimensionality reduction technique called Principal Component Analysis.

It can be seen that comments belonging to the same topic tended to be closer to each other than comments that belonged to other topics. This is what would be expected to be seen from a successfully applied topic model. Comments that lie further away from comments belonging to other topics would have had a higher probability of belonging to the topic that they were assigned, than other comments within their cluster that lay closer to comments belonging to other topics. If there was a random pattern in terms of how the comments of each topic were dispersed amongst each other, this would indicate that the probability distribution of the comments was more uniform and therefore the model was unable to identify clear themes within the corpus.

Of course there are exceptions to this as it can be seen that some comments lie closer to comments belonging to other topics. Some of the most notable comments that deviate, were the comments from the Risk Management 540 and Conduct 410 topics. These topics were already quite similar to each other and so it would be expected that some comments could be easily categorized as belonging to both of these topics and not just one. There were also a number of Financial 420 and Conduct 410 related comments that deviated away from their own clusters towards the cluster of the other respected topic.

For each of the three topics, a sample comment has been displayed below. It appears that the topic model did a good job of identifying the themes and then classifying the comments into the correct topic. As with any unsupervised learning task, there may be false positives present in the results however the topic model developed has minimized those false positives. While the effectiveness of the model can be validated using a manual effort from people with domain expertise, such a manual process would also introduce subjectivity and human bias and so it would require multiple people to provide a full and confident validation.

Conduct Topic:
Made sure compliance with internal procedures KYC, NBOC, etc., consulting with the compliance as needed.

Financial Topic:
Big part of John's previous role was the launch of the European product flow business. He has been the driving force of this critical new business for the region. November 1 will mark the official launch. We both agree that this product will be critical to the growth of the European equities platform. It is the driving force behind our decision to create a platform distribution team.

Risk Management Topic:
Excellent work on the review of suitability oversight with Jane Doe utilising your knowledge in bringing the oversight program up to date. The work that you did on remediating the annual reviews was excellent too, working as a team to bring ~470 reviews up to date. There will be an increased focus in 2020 around risk management/suitability including dealing errors.

Figure 9:
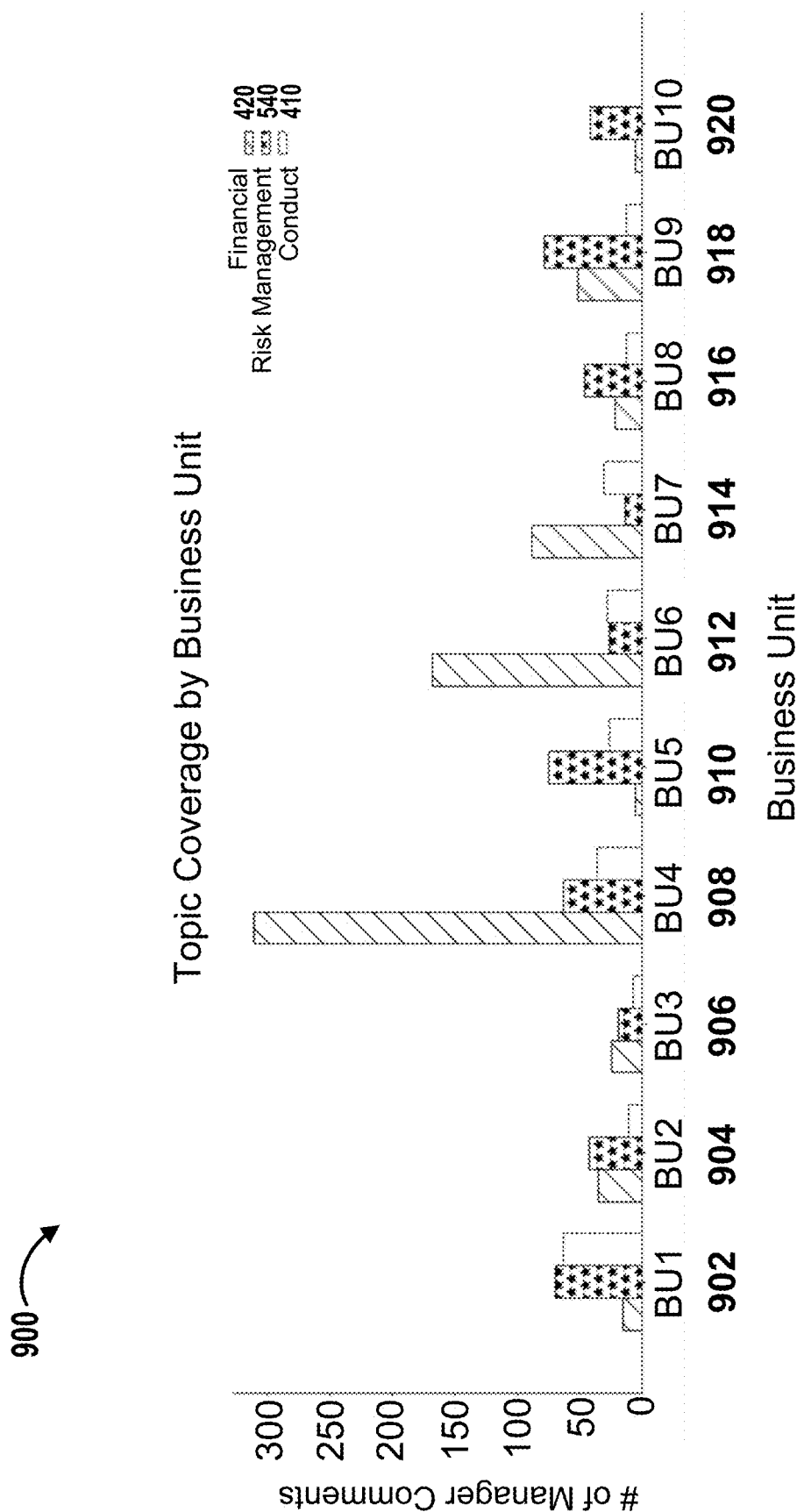
FIG. 9 illustrates, in a bar diagram, an example of a visualization output of topic coverage by business unit, in accordance with some embodiments.

The next step of the analysis involved looking at the topic coverage across the different business units. FIG. 9 illustrates, in a bar diagram, an example of a visualization output of topic coverage by business unit 900, in accordance with some embodiments. The top ten business units by number of manager comments that were classified into one of the three themes were filtered. The visualization shown in FIG. 9 shows the topic coverage across these ten business units. In this example the number of risk management 540, conduct 410 and financial 420 related comments are shown for different business units 902 to 920 for an organization. It can be readily seen in this visualization that certain business unit reviews have a disproportionate amount of financial 420 comments (see 908, 912, 914, 918) as compared to conduct 410 comments. Many of the ten business units were also front office functions.

In one analysis that was performed, Human Resources (HR) commented that for every financial related comment that a manager submitted on an employee performance review, that there should also be a conduct related comment. The analysis performed here shows that for the BU4 908, BU6 912 and BU7 914 business units, this was found to not be the case. Further investigation into the comments and their associated topics would need to be completed to verify whether or not the aforementioned business units did indeed place much more emphasis on financial related aspects of performance reviews as opposed to conduct related aspects. However the results of the topic model seem to suggest that this was the case. In some embodiments, a notification may be sent to a HR manager regarding the results.

Figure 10:
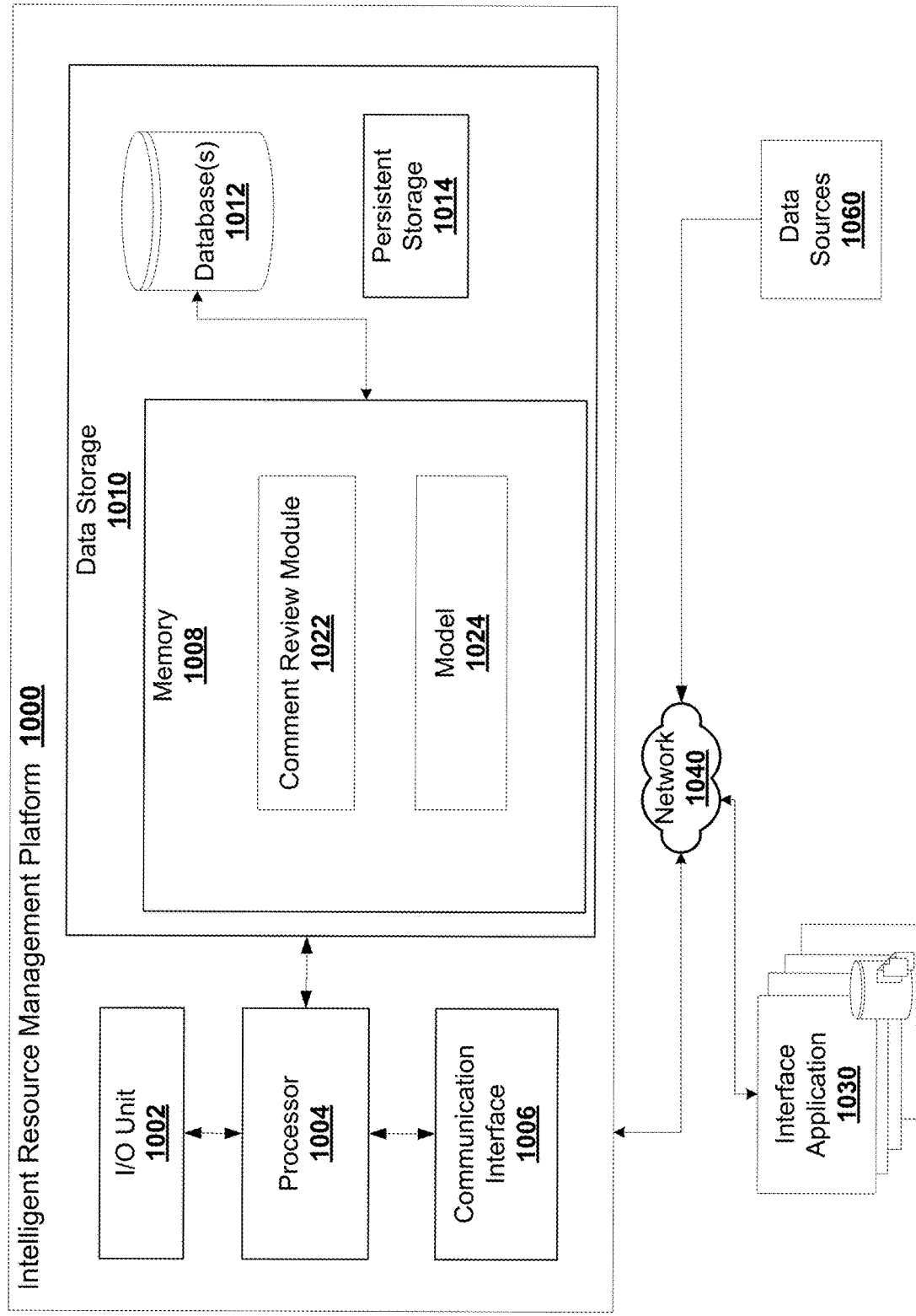
FIG. 10 illustrates, in a schematic diagram, an example of an employee review analysis and management platform, in accordance with some embodiments.

FIG. 10 illustrates, in a schematic diagram, an example of an employee review analysis and management platform 1000, in accordance with some embodiments. The platform 1000 may be an electronic device connected to interface application 1030 and data sources 1060 via network 1040. The platform 1000 can implement aspects of the processes described herein.

The platform 1000 may include a processor 1004 and a memory 1008 storing machine executable instructions to configure the processor 1004 to receive electronic employee review files (e.g., from I/O unit 1002 or from data sources 1060). The platform 1000 can include an I/O Unit 1002, communication interface 1006, and data storage 1010. The processor 1004 can execute instructions in memory 1008 to implement aspects of processes described herein.

The platform 1000 may be implemented on an electronic device and can include an I/O unit 1002, a processor 1004, a communication interface 1006, and a data storage 1010. The platform 1000 can connect with one or more interface devices 1030 or data sources 1060. This connection may be over a network 1040 (or multiple networks). The platform 1000 may receive and transmit data from one or more of these via I/O unit 1002. When data is received, I/O unit 1002 transmits the data to processor 1004.

The I/O unit 1002 can enable the platform 1000 to interconnect with one or more input devices, such as a keyboard, mouse, camera, touch screen and a microphone, and/or with one or more output devices such as a display screen and a speaker.

The processor 1004 can be, for example, any type of general-purpose microprocessor or microcontroller, a digital signal processing (DSP) processor, an integrated circuit, a field programmable gate array (FPGA), a reconfigurable processor, or any combination thereof.

The data storage 1010 can include memory 1008, database(s) 1012 and persistent storage 1014. Memory 1008 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 1010 can include memory 1008, databases 1012 (e.g., graph database), and persistent storage 1014.

The communication interface 1006 can enable the platform 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 1000 can be operable to register and authenticate users (using a login, unique identifier, and password for example) prior to providing access to applications, a local network, network resources, other networks and network security devices. The platform 1000 can connect to different machines or entities.

The data storage 1010 may be configured to store information associated with or created by the platform 1000. Storage 1010 and/or persistent storage 1014 may be provided using various types of storage technologies, such as solid state drives, hard disk drives, flash memory, and may be stored in various formats, such as relational databases, non-relational databases, flat files, spreadsheets, extended markup files, etc.

The memory 1008 may include a comment review module 1022 for performing the methods and processes described herein, and a data model 1024.

Figure 11:
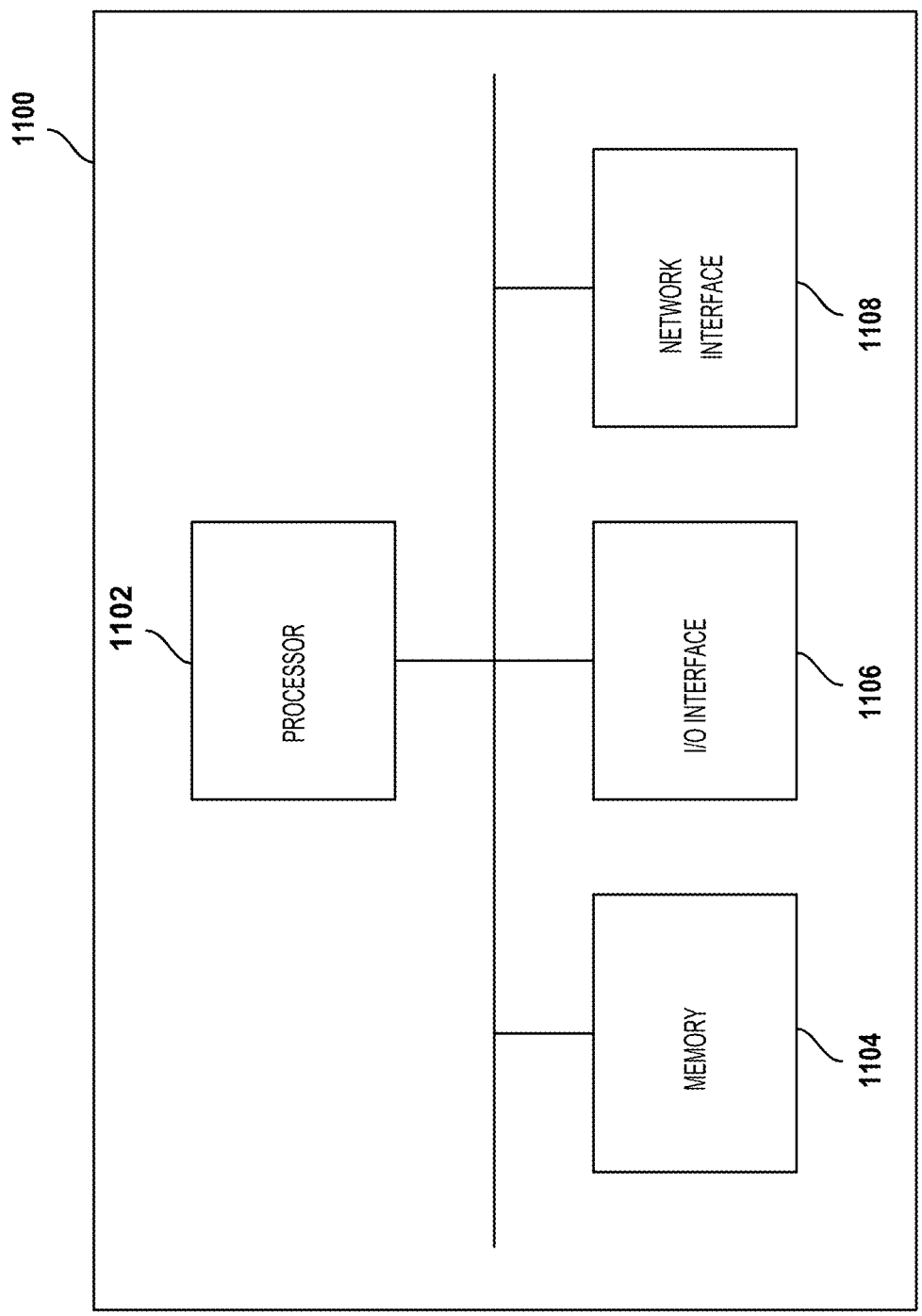
FIG. 11 illustrates, in a block diagram, an example of a computing device, in accordance with some embodiments.

Reference is made to FIG. 11, which illustrates a block diagram of a computing device 1000, in accordance with an embodiment of the present application. As an example, the source device 110 or the data record management system 120 of FIG. 1 may be implemented using the example computing device 1100 of FIG. 11.

The computing device 1100 includes at least one processor 1102, memory 1104, at least one I/O interface 1106, and at least one network communication interface 1108.

The processor 1102 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 1104 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 1106 may enable the computing device 1100 to interconnect with one or more input devices, such as a keyboard, mouse, camera, touch screen and a microphone, or with one or more output devices such as a display screen and a speaker.

The networking interface 1108 may be configured to receive and transmit data sets representative of the machine learning models, for example, to a target data storage or data structures. The target data storage or data structure may, in some embodiments, reside on a computing device or system such as a mobile device.

In some embodiments, there may be processor-executable instructions or software that, when executed, by a processor converts the computing device 1000 into a special purpose computing device to perform particular operations pursuant to instructions of the processor-executable instructions.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system of data record management, the system comprising:
a communication interface;
at least one processor coupled to the communication interface; and
a memory coupled to the at least one processor and storing processor-executable instructions that, when executed, configure the at least one processor to:
receive a plurality of unstructured natural language data records;
generate a structured dataset based on the plurality of unstructured natural language data records, the structured dataset including a topic frequency value associated with respective terms of each of the plurality of unstructured natural language data records for different topics;
transform the structured dataset to normalize the respective topic frequency values;
for each of the unstructured natural language data records:
determine a topic prediction value associated with that unstructured natural language data record based on the transformed structured dataset; and
generate a communication signal for displaying on a graphical user interface a message identifying:
one or more topics associated with the unstructured natural language data records, each unstructured natural language data record associated with at least one of the one or more topics.

2. The system of claim 1, wherein the at least one processor is configured to, for each of the unstructured natural language data records, determine a redundancy prediction value associated with the respective unstructured natural language data record by determining a cosine similarity value between that unstructured natural language data record and one or more other unstructured natural language data records in the plurality of unstructured natural language data records.

3. The system of claim 1, wherein to transform the structured dataset to normalize the respective topic frequency values, the at least one processor is configured to generate a Term Frequency-Inverse Document Frequency (TF-IDF) matrix based on the structured dataset.

4. The system of claim 1, wherein the at least one processor is configured to:
for each of the unstructured natural language data records, determine a redundancy prediction value associated with that unstructured natural language data record; and
wherein the at least one processor is configured to determine the redundancy prediction value for that unstructured natural language data records based on a relative number of data records in the plurality of unstructured natural language data records having the topic prediction value of that unstructured natural language data record.

5. The system of claim 4, wherein the at least one processor is configured to determine the topic prediction value based on topic modelling including Non-Negative Matrix Factorization (NMF).

6. The system of claim 4, wherein to determine the redundancy prediction value the at least one processor is configured to determine whether the topic prediction value associated with that unstructured natural language data record is similar to a data record category associated with that unstructured natural language data record.

7. The system of claim 1, wherein the transformed structured dataset is generated based on inverse proportionality of the respective topic frequency values.

8. The system of claim 1, wherein the at least one processor is configured to generate the structured dataset based on a bag-of-words model of the plurality of unstructured natural language data records.

9. The system of claim 8, wherein the bag-of-words model is based on n-grams having two or more terms.

10. A computer-implemented method of data record management, the method comprising:
receiving a plurality of unstructured natural language data records;
generating a structured dataset based on the plurality of unstructured natural language data records, the structured dataset including a topic frequency value associated with respective terms of each of the plurality of unstructured natural language data records for different topics;

transforming the structured dataset to normalize the respective topic frequency values;

for each of the unstructured natural language data records:
determining a topic prediction value associated with that unstructured natural language data record based on the transformed structured dataset; and generating a communication signal for displaying on a graphical user interface a message identifying:
one or more topics associated with the unstructured natural language data records, each unstructured natural language data record associated with at least one of the one or more topics.

11. The method of claim 10, wherein the method further comprises, for each of the unstructured natural language data records, determining a redundancy prediction value associated with the respective unstructured natural language data record by determining a cosine similarity value between that unstructured natural language data record and one or more other unstructured natural language data records in the plurality of unstructured natural language data records.

12. The method of claim 10, wherein transforming the structured dataset to normalize the respective topic frequency values includes generating a Term Frequency-Inverse Document Frequency (TF-IDF) matrix based on the structured dataset.

13. The method of claim 10, comprising:
for each of the unstructured natural language data records, determining a redundancy prediction value associated with that unstructured natural language data record; and
determining the redundancy prediction value for that unstructured natural language data records based on a relative number of data records in the plurality of unstructured natural language data records having the topic prediction value of that unstructured natural language data record.

14. The method of claim 13, comprising determining the topic prediction value based on topic modelling including Non-Negative Matrix Factorization (NMF).

15. The method of claim 13, wherein determining the redundancy prediction value includes determining whether the topic prediction value associated with that unstructured natural language data record is similar to a data record category associated with that unstructured natural language data record.

16. The method of claim 13, comprising generating the structured dataset based on a bag-of-words model of the plurality of unstructured natural language data records.

17. The method of claim 16, wherein the bag-of-words model is based on n-grams having two or more terms.

18. The method of claim 10, wherein the transformed structured dataset is generated based on inverse proportionality of the respective topic frequency values.

19. The method of claim 10, wherein one or more unstructured natural language data records are associated with a respective redundancy prediction value greater than a threshold value.

20. A non-transitory computer-readable medium or media having stored thereon machine interpretable instructions which, when executed by a processor, cause the processor to perform a computer implemented method of data record management, the method comprising:

receiving a plurality of unstructured natural language data records;

generating a structured dataset based on the plurality of unstructured natural language data records, the structured dataset including a topic frequency value associated with respective terms of each of the plurality of unstructured natural language data records for different topics;

transforming the structured dataset to normalize the respective topic frequency values;

for each of the unstructured natural language data records:
determining a topic prediction value associated with that unstructured natural language data record based on the transformed structured dataset; and generating a communication signal for displaying on a graphical user interface a message identifying:
one or more topics associated with the unstructured natural language data records, each unstructured natural language data record associated with at least one of the one or more topics.

* * * * *